Patented Oct. 13, 1925.

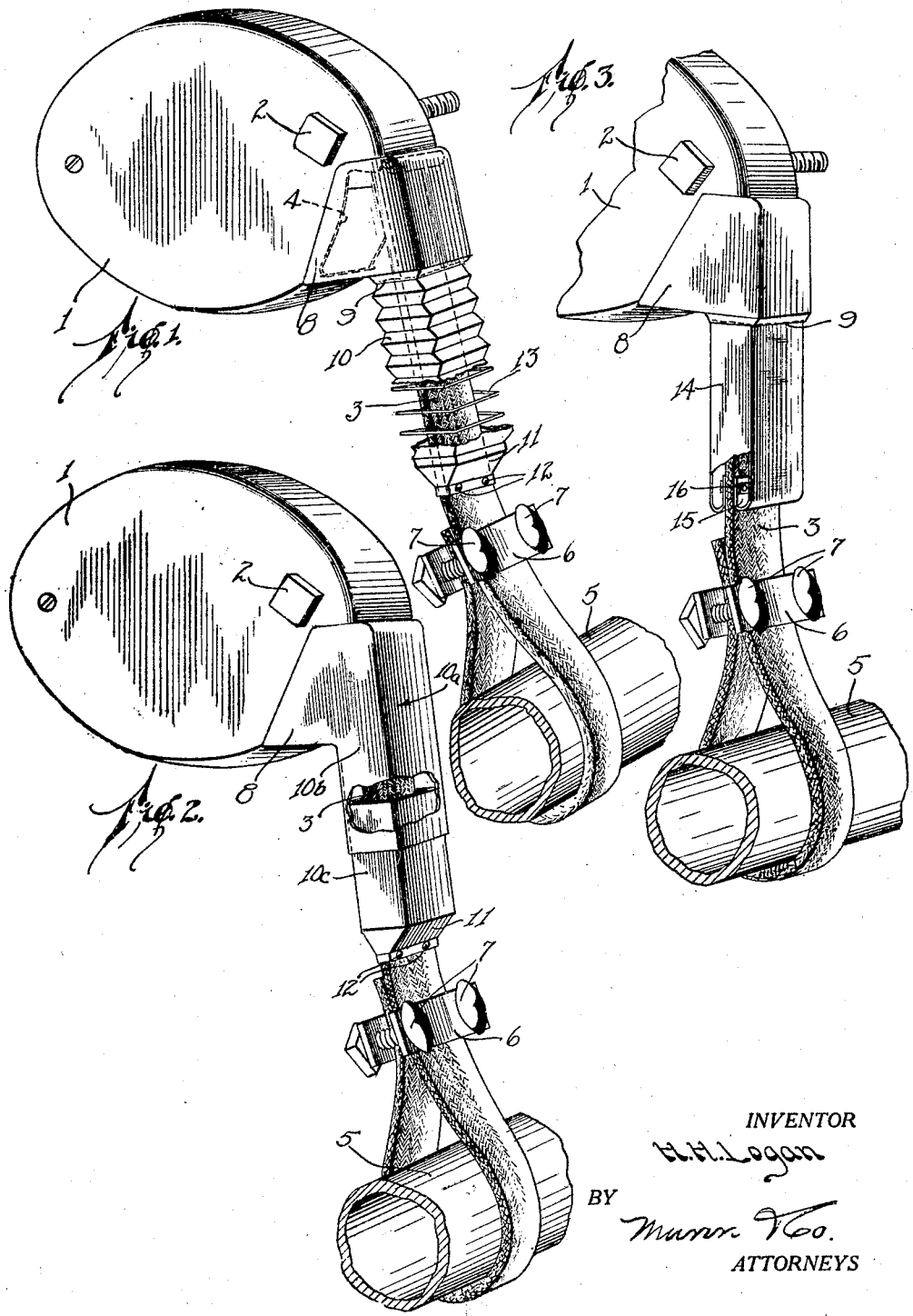

1,557,314

UNITED STATES PATENT OFFICE.

HENRY HAVELOCK LOGAN, OF CHICAGO, ILLINOIS.

DUST GUARD FOR SHOCK ABSORBERS.

Application filed January 11, 1924. Serial No. 685,623.

*To all whom it may concern:*

Be it known that I, HENRY HAVELOCK LOGAN, a citizen of Great Britain (who has declared his intention of becoming a citizen of the United States), and a resident of Chicago, in the county of Cook and State of Illinois, have invented a new and useful Improvement in Dust Guards for Shock Absorbers, of which the following is a full, clear, and exact description.

My invention relates to improvements in dust guard for shock absorber, snubbers, and the like, and it consists in the combinations, constructions, and arrangements herein described and claimed.

An object of my invention is to provide a dust and mud guard for use with the ordinary type of shock absorber or snubber, by means of which the presence of dust and other extraneous substances in the working parts of the shock absorber is entirely excluded.

A further object of my invention is to provide a dust and mud guard of the type described which is telescopic in structure so that it may vary in length as the chassis and axle housings of the vehicle move toward or away from one another.

A further object of my invention is to provide a dust and mud guard of the type which may be easily attached to the ordinary type of shock absorber without the necessity of reconstructing the shock absorber, and which is compact in form, durable, and thoroughly practical commercially.

Other objects and advantages will appear in the following specification, and the novel features of the invention will be particularly pointed out in the appended claims.

My invention is illustrated in the accompanying drawings forming part of this application, in which Figure 1 is a perspective view of an embodiment of my invention, Figure 2 is a perspective view of a modified form of my invention, and Figure 3 is a perspective view of another modified form of my invention.

In carrying out my invention, I make use of the ordinary type of shock absorber or snubber consisting in a housing 1 which is secured directly to the chassis of the motor vehicle by means of bolts 2 projected through the housing and secured to the frame of the chassis, (not shown).

A fabric strap 3 of wear resisting material is wound about a spring actuated drum disposed within the casing 1 and the outer end thereof projected through an opening 4 in the casing 1. The extreme outer end of the strap 3 is wound about the axle housing 5 of the motor vehicle and clamped against movement to the adjacent portion of the strap by means of a clamping member 6 having bolts 7 which when tightened secure the adjacent parts of the strap 3 against movement relative to one another.

This type of shock absorber or snubber is well known in the art and I therefore deem it unnecessary to describe in detail the particular mechanism employed for resisting the outward movement of the strap 3 through the opening 4 and for permitting the free movement of the strap 3 inwardly through the opening 4 and about the drum in the casing 1.

My present invention involves the provision of a cap 8 secured to the outer portion of the casing 1 concentric with the opening 4. This cap 8 has an opening through the lower wall thereof encompassed by a side wall 9.

A flexible tubular casing 10 is secured at one end of the side walls 9 at the lower end to a collar 11. The collar 11 is riveted at 12 to the fabric strap 3 at that point adjacent the clamping member 6.

A coiled spring angular in cross section and lying entirely free of the strap 3 is disposed concentric with the strap. This spring is indicated at 13. The spring 13 is arranged to bear upon the inner wall of the tubular member 10 so as to hold the member 10 out of engagement with the strap 3 and thereby avoid unnecessary friction when the strap 3 is moved as by an upward or downward movement of the axle housing 5.

From the foregoing description of the various parts of the device, the operation thereof may be readily understood. It will be noted from the construction shown in Figure 1 that my dust guard for shock absorber may be applied as an attachment to the shock absorber without reconstruction of the casing 1. In operation, the telescopic tubular casing 10 will telescope in much the same manner as the ordinary type of bellows employed in cameras and the like, as the strap 3 moves inwardly through the opening 4. The spring 13 will retain the telescopic casing 10 against frictional engagement with the strap, and thereby permit free movement of the strap. The connection between the collar 11, the strap 3, and the telescopic casing 10 is dust-proof as is the connection between the cap 8 and the casing 1, and the cap 8 with the tubular member 10. Therefore the presence of dust, mud, and other extraneous substances in the casing 1 is entirely precluded, so that the parts within the casing are not subjected to abnormal wear, as would be the case if sand or grit from the road should find its way within the casing.

In Figure 2 I have shown a modified form of my invention, in which I employ a telescopic casing 10$^a$ comprising a rigid tube 10$^b$, angular in cross section, and a rigid tube 10$^c$, closely fitted, and arranged to slide within the casing 10$^b$. The upper end of the casing 10$^b$ merges with the cap 8 and forms a part thereof, while the lower end of the casing 10$^c$ merges with and forms a part of the collar 11.

This form of my invention operates in precisely the same manner as the preferred form, except that the member 10$^c$ slides within the member 10$^b$ as the strap 3 moves toward or away from the casing 1.

In Figure 3 I have shown still another modified form of my invention, in which a fabric casing 14 is secured at its upper end to the side walls 9 of the cap 8, and the lower end 15 of the casing 14 is riveted directly to the strap 3 by means of rivets 16 in such a manner as to cause the lower end of the casing to move upwardly within itself as the strap 3 is moved upwardly. This form of my invention also functions in precisely the same manner as the form shown in Figure 1.

I claim:

1. The combination with a shock absorber having a casing and a flexible strap extending exteriorly thereof and arranged for longitudinal movement toward or away from said casing when said shock absorber is in operation, of an extendible tubular flexible casing disposed concentric with said flexible strap and secured to said casing at one end, means for securing the opposite end of said tubular casing to said strap at a point adjacent to its lowermost end, and means within said tubular casing for maintaining the inner walls of said casing out of engagement with said strap.

2. The combination with a shock absorber having a casing and a flexible strap extending exteriorly thereof and arranged for longitudinal movement toward or away from said casing when said shock absorber is in operation, of an extendible tubular flexible casing disposed concentric with said flexible strap and secured to said casing at one end, means for securing the opposite end of said tubular casing to said strap at a point adjacent to its lowermost end, and means within said tubular casing for maintaining the inner walls of said casing out of engagement with said strap, there being a sufficient portion of said strap extending beyond the lowermost end of said tubular casing to permit the strap to be secured to a portion of a motor vehicle adjacent to the shock absorber.

HENRY HAVELOCK LOGAN.